United States Patent [19]
Nalle, Jr.

[11] 3,782,872
[45] Jan. 1, 1974

[54] APPARATUS FOR EXTRUDING WOVEN PLASTIC MESH

[76] Inventor: George S. Nalle, Jr., 108 W. 2nd St., Austin, Tex. 78701

[22] Filed: Mar. 15, 1972

[21] Appl. No.: 234,815

[52] U.S. Cl............................ 425/131, 425/382 N
[51] Int. Cl............................................. B29f 3/12
[58] Field of Search...................... 425/131, 382 N; 264/DIG. 81

[56] References Cited
UNITED STATES PATENTS

| | | | |
|---|---|---|---|
| 3,394,431 | 7/1968 | Nolle, Jr. ........................ | 425/382 N |
| 3,466,359 | 9/1969 | Van Burleigh et al.......... | 425/382 N |
| 3,550,202 | 12/1970 | Fairbanks ...................... | 425/131 X |
| 3,632,714 | 1/1972 | Fairbanks ................... | 425/382 N X |

FOREIGN PATENTS OR APPLICATIONS 1,109,131   6/1961   Germany .................... 264/DIG. 81

Primary Examiner—Robert D. Baldwin
Assistant Examiner—Ronald J. Shore
Attorney—Tom Arnold et al.

[57] ABSTRACT

Apparatus for producing a woven plastic mesh product extrudes plastic mesh from molten thermoplastic by continuously extruding first and second sets of parallel filaments through extrusion orifices between a pair of abutting rotatable cylindrical die members. The cylindrical die members are grooved to extrude two sets of filaments perpendicular to and passing on opposite sides of one another when the die members are counterrotated in register.

13 Claims, 7 Drawing Figures

APPARATUS FOR EXTRUDING WOVEN PLASTIC MESH

BACKGROUND OF THE INVENTION

This invention relates to apparatus for extruding plastic mesh and, more particularly, to apparatus for extruding a woven plastic mesh product from a melt of thermoplastic.

A wide variety of apparatus for production of plastic mesh or net is well known to those familiar with the art and may be exemplified by my U. S. Pat. Nos. 3,067,084, 3,127,298, and 3,394,431. The mesh produced by such apparatus may be generally characterized as comprising two sets of parallel filaments, each of the sets defining a plane and the two planes being adjacent such that the filaments of each set intersect the filaments of the other set. In some cases, the planes defined by the two sets of filaments may coincide. Although such mesh has found numerous applications in packaging, decorating and other uses, it has found little use in applications where the bulk, appearance, or texture of fabrics is desired.

It is a principal object of this invention to provide apparatus for extruding a woven plastic mesh product.

A further object of this invention is to provide apparatus for economically producing a woven plastic mesh product by extrusion from one or more melts of thermoplastic.

Another object of this invention is to provide apparatus for making mesh structure having an appearance closely resembling that of a woven fabric from one or more melts of thermoplastic.

Still another object of the present invention is to provide apparatus for directly extruding a woven plastic fabric from two or more different colors or compositions of thermoplastic material.

Among the other and further objects of this invention as disclosed and claimed herein is to provide an apparatus for simultaneously and continuously extruding the warp and weave strands of a woven plastic mesh from one or more melts of thermoplastic material.

SUMMARY OF THE INVENTION

The foregoing objects are accomplished in accordance with the present invention wherein a pair of rotatable cylindrical extrusion die members is mounted at the discharge of a suitable die body to define a confined space with the die body such as is taught by my U. S. Pat. No. 3,394,431. Molten pressurized thermoplastic is supplied to the confined space by conventional means.

Each of the cylindrical extrusion members contains a first set of parallel surface grooves defining raised portions of the cylindrical surface between the grooves. The grooves are located on each of the extrusion members so that the raised portions of one member abut the raised portions of the other member to define a tangent line between the two members. The tangent line is also the point of extrusion. Each of the extrusion members also contains a second set of surface grooves perpendicular to the grooves of the first set. Each of the grooves of the second set intersects and defines a further groove in one of the grooves of the first set.

The grooves of the second set are located on each of the extrusion members to extrude a set of continuous filaments when the extrusion members are counterrotated in register, each of the filaments of the second set passing on opposite sides of adjacent filaments extruded from the first set of grooves. Adjacent filaments of the second set also pass on opposite sides of any given filament of the first set. This effect is achieved by extruding the first set of parallel filaments centered on the tangent line, and forming the second set of filaments in grooves which define a path alternating back and forth between the extrusion members. In this way the second filaments are passed on first one side and then on the other of adjacent filaments of the first set.

Each of the second set of grooves has a deepest region where it intersects and defines the groove in a groove of the first set. The groove depth then diminishes between that intersection and the end of the groove. The groove ends before intersecting the next adjacent groove of the first set, on either side of the groove intersected, but extends sufficiently far that the mating groove on the other extrusion member will overlap at least a portion of that groove when the extrusion members are counterrotated in register. This region of overlap between individual grooves of the second set is necessary for extrusion of a continuous filament, as the thermoplastic filling each of those grooves is welded to that filling the other groove at the overlapping region as the filament is extruded.

BRIEF DESCRIPTION OF THE DRAWINGS

The manner in which the above objects of this invention, as well as others which will become apparent, are attained is explained more particularly in the following specification describing the present invention with reference to the drawings.

DESCRIPTION OF PREFERRED EMBODIMENTS

Conventional weaving typically consists of interlacing two sets of flexible materials at right angles, the filaments of each set passing on opposite sides of adjacent filaments of the other set. Of course, the basic weaving process may be varied to accomplish patterned weaving wherein one or more given filaments of the first set may pass two or more filaments of the second set on the same side to create variations in texture and appearance from the typical woven product. The term "woven" as used in connection with a plastic mesh product herein refers to a product having the appearance of a fabric-like structure in which two sets of generally parallel filaments intersect one another in an interlaced relationship.

It will be understood that the term "filament" is used herein with reference to extruded plastic filamentous products having any cross sectional shape which may be, for example, circular, triangular, rectangular or ribbon-like, ellipsoidal, or the like. The formation of such filaments is well known in the art.

The term "thermoplastic" as used herein refers to materials capable of melt or compression extrusion in a molten state through dies and settable by cooling on issuance from the dies. Suitable thermoplastic materials include polyethylene, polypropylene, polyamides, such as nylon, polyesters, polyvinylchlorides, or other vinyl polymers or copolymers, acrylic polymers or copolymers, other polyolefins, cellulosic materials, such as cellulose acetate, natural or synthetic rubbers and rubber-like materials, metals, cermets, and other materials with like properties.

Figure 1:
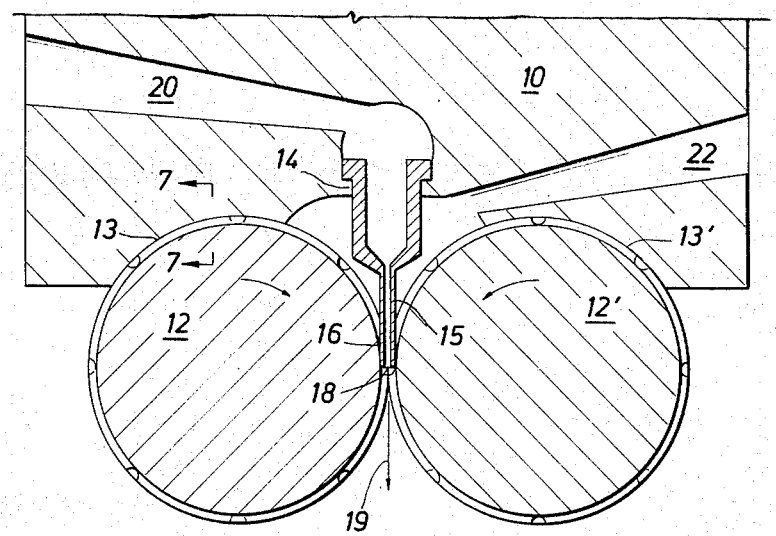
FIG. 1 is a partial sectional view of one embodiment of die apparatus in accordance with the present invention.

FIG. 1 illustrates one embodiment of the apparatus of this invention by which a woven plastic mesh is produced from one or more melts of thermoplastic. This apparatus consists of a die body 10 having two cylindrical grooved rollers 12, 12' positioned adjacent one another and in slidable contact with curvilinear surfaces 13, 13', respectively, of the die body. The cylindrical grooved rollers, or extrusion members, 12, 12' are suitably mounted for rotation about their axes by conventional means. The axes of extrusion members 12, 12' are located at right angles to the direction of extrusion, identified by reference numeral 19. A tangent line is defined by the abutting extrusion members, and is identified by reference numeral 18.

Within die body 10 there is a channel 22 communicating with a first source of molten pressurized thermoplastic. The thermoplastic passes through the channel 22 to the point of extrusion between rollers 12, 12'. Also located within die body 10 is die means 14 communicating through channel 20 with a second source of molten pressurized thermoplastic. At the lower end of die means 14 are a series of channels 15 terminating in extrusion orifices 16. The extrusion orifices 16 are spaced along the tangent line 18 at locations corresponding to mating circumferential grooves in extrusion members 12, 12'.

Figure 2:
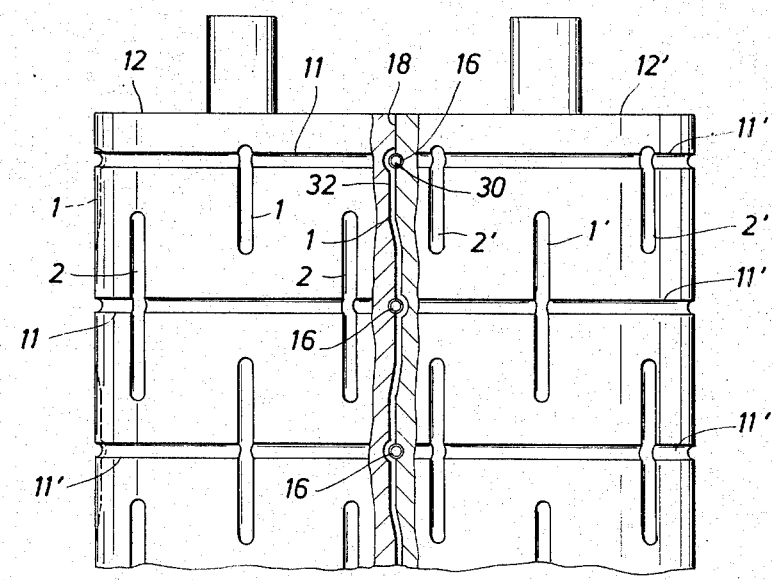
FIG. 2 is a partial sectional bottom view of the die apparatus of FIG. 1 showing in detail the groove pattern which defines the extruded woven mesh.

FIG. 2 is a partial sectional bottom view of extrusion members 12, 12'. It will be noted that each of the extrusion members contains a set of spaced-apart mating circumferential surface grooves, 11 and 11', respectively, and a number of transverse surface grooves indicated by the reference numerals 1, 2, 1', 2', respectively. As shown in the selected portion of FIG. 2, when grooves 1, 1' are in mating relation at the tangent line, they define a continuous path which passes back and forth between the rollers and on opposite sides of adjacent longitudinal strands 30 extruded through orifices 16. As the rollers are counterrotated in register, a transverse filament is extruded. This filament passes on opposite sides of adjacent longitudinal filaments. As the rollers continue to counterrotate in register, grooves 2, 2' come into mating relation to define another continuous groove which passes on the opposite side of each of the longitudinal filaments.

Figure 7:
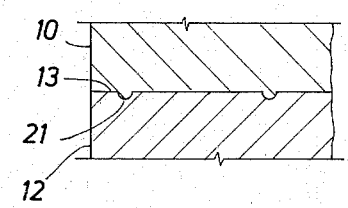
FIG. 7 is a partial sectional view taken at 7—7 of FIG. 1.

Curvilinear surface 13 of die body 10 contains a plurality of raised portions 21 as shown in FIG. 7. Each raised portion 21 is in slidable contact with the surface of a corresponding circumferential groove 11 of roller 12 for preventing flow of thermoplastic between roller 12 and surface 13. Similarly, surface 13' contains raised portions corresponding to the circumferential grooves 11' of roller 12' for preventing the flow of thermoplastic between roller 12' and surface 13'.

It should be noted that the area of overlap between, for example, grooves 1 and 1' in this embodiment illustrated in FIG. 2 covers an area comprising approximately the middle one-third of the distance between adjacent longitudinal strands. The molten thermoplastic in each of the grooves 1, 1' must bond to that in the overlapping portion of the other groove as the transverse filaments are extruded. Because the relative velocity between the molten thermoplastic and each of the roller extrusion members is zero at the point of extrusion, a good bond may be created and the transverse filaments will be produced as continuous strands.

Figure 3:
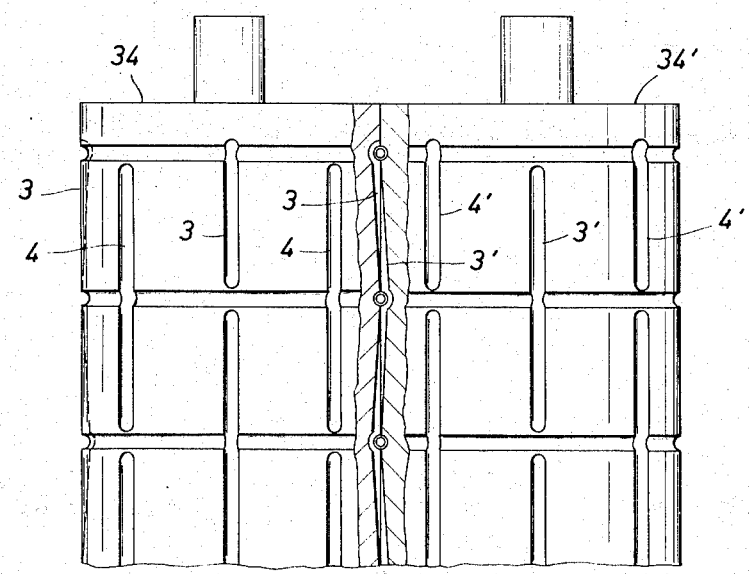
FIG. 3 is another partial bottom view of die apparatus such as that illustrated in FIG. 1 and showing in detail a slightly different groove pattern for defining the extruded woven mesh.

FIG. 3 illustrates a slightly modified embodiment of the cylindrical rollers of FIG. 2, consisting of roller extrusion members 34, 34' having transverse grooves 3, 4, 3', 4' on their respective surfaces. As the sectioned portion of FIG. 3 shows, the region of overlap between pairs of transverse grooves 3, 3' covers substantially the entire distance between adjacent longitudinal strands. This provides for a smoother transition of the transverse filaments from one roller to the other as they are formed at the tangent line, and provides an increased area for bonding of those portions of the filaments formed by the respective rollers. As the rollers of FIG. 3 continue to counterrotate in register, transverse grooves 4, 4' will come into mating relation to define a corresponding extruded filament. Of course, the amount of overlap between the respective pairs of transverse grooves may be varied as desired to achieve various appearance effects and degrees of bonding within the transverse filaments. It will be readily apparent that there must be at least some overlap of the mating transverse grooves, and this may suitably be achieved when each of the grooves extends from about sixty percent to about 95 percent of the distance between adjacent longitudinal filaments.

Figure 4:
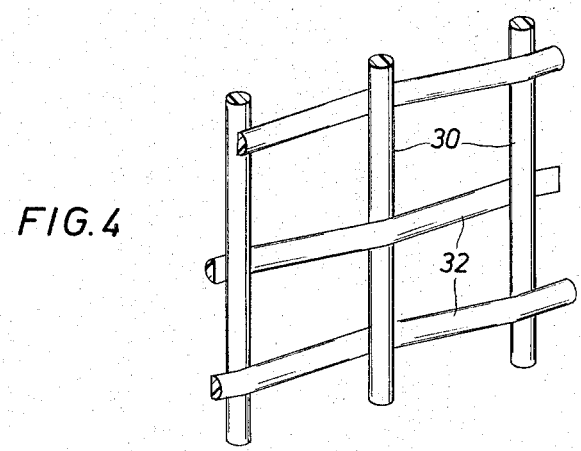
FIG. 4 is a perspective view of a segment of woven plastic mesh such as that produced by the apparatus of FIGS. 1 and 2.

FIG. 4 illustrates in perspective a segment of the woven thermoplastic mesh produced by the apparatus of this invention. Filaments 30 represent the longitudinal filaments of the mesh while filaments 32 represent the transverse filaments. Each transverse filament 32 passes on opposite sides of adjacent longitudinal filaments 30. Also, adjacent transverse filaments 32 pass on opposite sides of any given longitudinal filament 30. Thus, the plastic mesh product produced by the apparatus of this invention has the appearance of a woven material. Of course, the size and spacing of the transverse and longitudinal filaments is a function both of the size and spacing of the respective grooves in the roller extrusion members and of the speed of counterrotation of these rollers, and may be varied as desired.

Figure 5:
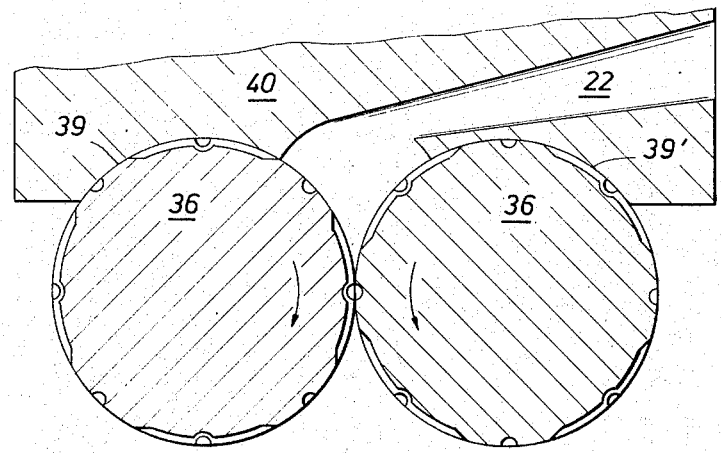
FIG. 5 is a partial sectional view of another embodiment of die apparatus in accordance with the present invention.
Figure 6:
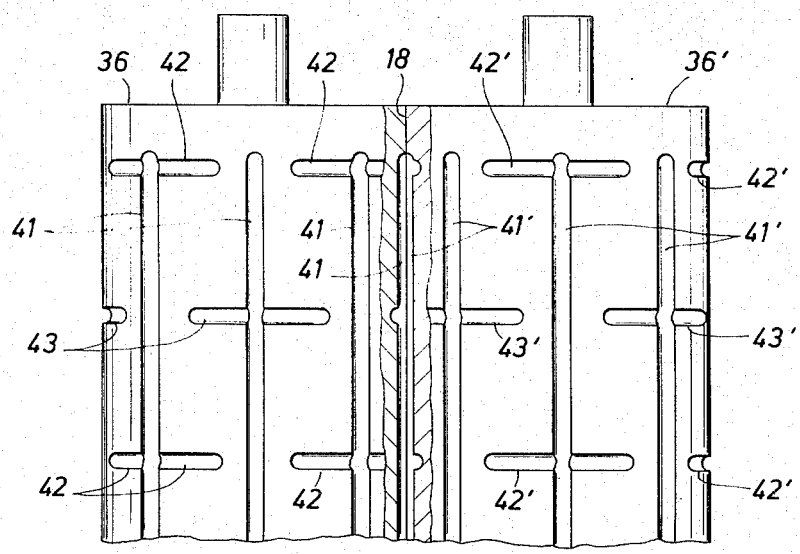
FIG. 6 is a partial bottom sectional view of the die apparatus of FIG. 5 showing in greater detail the groove pattern which defines the pattern of the woven mesh extruded therefrom.

FIGS. 5 and 6 illustrate still another embodiment of the present invention wherein rollers 36, 36' are mounted in abutting tangent relation with one another at the discharge end of die body 40 to define a confined space therewith. The confined space communicates with a supply of molten pressurized thermoplastic through channel 22. Each of the roller extrusion members contains a series of parallel transverse surface grooves 41, 41', respectively, which are so located on the rollers that when the rollers are counterrotated in register, a series of transverse filaments is formed, each of the filaments being centered at the tangent line as it is extruded. The rollers additionally contain arcuate surface grooves 42, 42' and 43, 43' for extrusion of continuous longitudinal filaments, each of which is formed by first one roller and then the other, passing back and forth between the rollers similarly to the transverse filaments formed by the rollers of FIGS. 2 and 3. Note that the filaments formed by grooves 42, 42' will pass on opposite sides of adjacent transverse filaments formed by grooves 41, 41'. Similarly, the longitudinal filaments formed by grooves 43, 43' will pass on opposite sides of adjacent transverse filaments, as well as on the opposite side of any transverse filament from those longitudinal filaments formed by grooves 42, 42'.

The woven plastic mesh extruded by apparatus such as that illustrated in FIGS. 5 and 6 may be visualized by turning the perspective mesh segment of FIG. 4 90°, whereupon the transverse filaments will be represented by reference numeral 30, and longitudinal filaments by reference numeral 32.

It will be apparent that various modifications of the foregoing apparatus may be accomplished to produce variations of the woven mesh product illustrated, such as, for example, changing the relative positions or angles of the grooves on the extrusion members to produce rectangular mesh or other patterns. The apparatus of FIGS. 1–3 might readily be modified to provide selected of extrusion orifices 16 with molten pressurized thermoplastic from a third source, for extrusion of longitudinal filaments in a variety of colors or compositions of material, or both. Each orifice 16 could be individually supplied with thermoplastic for the greatest variety. Alternatively, channel 20, die means 14, channels 15, and orifices 16 might all be omitted, and the entire woven mesh extruded from a single melt of thermoplastic supplied through channel 22. Accordingly, the scope of the present invention is limited only by the appended claims.

What is claimed is:

1. Apparatus for extruding a woven thermoplastic mesh, comprising:
    a die body having a discharge end;
    first and second rotatable cylindrical extrusion members disposed in abutting tangent relation at the discharge end and defining a confined space with said die body; each of said extrusion members having:
       a first set of parallel surface grooves disposed thereon to mate with corresponding grooves on the other extrusion member for extruding a first set of parallel filaments; and
       a second set of surface grooves perpendicular to said first grooves, each of said second grooves intersecting and defining a groove in one of said first grooves; said second grooves being disposed on said extrusion member to mate only with portions of corresponding grooves of said second set at locations between adjacent grooves of said first set to extrude a second set of filaments, at least some of the filaments of said second set passing on opposite sides of adjacent filaments of said first set; and
    means for supplying molten thermoplastic to said confined space.

2. Apparatus as recited in claim 1 wherein said first sets of grooves are disposed parallel the axes of rotation of said extrusion members.

3. Apparatus as recited in claim 1 wherein said first sets of grooves are disposed circumferentially on said extrusion members.

4. Apparatus as recited in claim 3 including means for preventing flow of thermoplastic through said circumferential grooves between each of said first and second extrusion members and said die body.

5. Apparatus as recited in claim 1 wherein each groove of said second set intersects and defines a groove in not more than one of the grooves of said first set.

6. Apparatus as reicted in claim 1 wherein said second sets of grooves are disposed on each of said extrusion members to extrude a second set of filaments, each filament of said second set passing on opposite sides of adjacent filaments of said first set and adjacent filaments of said second set passing on opposite sides of each filament of said first set when said extrusion members are counterrotated in register.

7. Apparatus for extruding a woven thermoplastic mesh, comprising:
    a die body having a discharge end;
    first and second rotatable cylindrical extrusion members disposed in abutting tangent relation at the discharge end to define a tangent line perpendicular to the direction of extrusion between said members, said members defining a confined space with said die body, said confined space communicating with a first supply of molten thermoplastic; each of said extrusion members having:
       a set of spaced-apart circumferential surface grooves defining raised portions therebetween in the surface of said member, the raised portions of one member abutting corresponding raised portions of the other member at the tangent line to define a series of orifices between said extrusion members for extruding a plurality of longitudinal filaments; and
       a set of transverse surface grooves, each of said transverse grooves intersecting and defining a groove in one of the circumferential grooves, said transverse grooves being disposed on said extrusion members to periodically define a continuous transverse groove at the tangent line consisting of a series of partially overlapping transverse grooves alternating between said first and second extrusion members, for extrusion of a series of transverse filaments when said extrusion members are counterrotated in register; and
    means for preventing flow of thermoplastic through said circumferential grooves between each of said first and second extrusion members and said die body.

8. Apparatus as recited in claim 7 wherein each of said transverse grooves extends from each intersected circumferential groove a distance of from about sixty percent to about 95 percent of the width of the raised portions defined between adjacent circumferential grooves.

9. Apparatus as recited in claim 7 wherein said transverse grooves are disposed on said extrusion members for extrusion of a series of transverse filaments when said extrusion members are counterrotated in register, each of said transverse filaments passing on the opposite side of adjacent longitudinal filaments and adjacent transverse filaments passing on opposite sides of each longitudinal filament.

10. Apparatus as recited in claim 7 wherein said transverse surface grooves define a region of greatest groove depth at the intersection of said transverse groove with a circumferential groove and wherein the depth of the transverse groove decreases from the region of greatest depth to the ends of said groove.

11. Apparatus as recited in claim 7 including die means within said die body and communicating with a second supply of molten thermoplastic for extruding said longitudinal filaments.

12. Apparatus as recited in claim 11 wherein said die means includes a plurality of channels having extrusion orifices substantially at said tangent line for extrusion of said longitudinal filaments.

13. Apparatus as recited in claim 12 wherein at least some of said channels communicate with a third source of molten thermoplastic for extrusion of corresponding of said longitudinal filaments.

* * * * *